United States Patent [19]

Schneidmiller

[11] Patent Number: 4,873,787
[45] Date of Patent: Oct. 17, 1989

[54] ENTRY STRUCTURE FOR FLEXIBLE BAG TYPE INSECT TRAP

[76] Inventor: Rodney G. Schneidmiller, S. 1911 Conklin, Veradale, Wash. 99037

[21] Appl. No.: 244,042

[22] Filed: Sep. 14, 1988

[51] Int. Cl.[4] ............................................. A01M 1/10
[52] U.S. Cl. ...................................... 43/122; 43/107; 43/118
[58] Field of Search .......................... 43/107, 118, 122

[56] References Cited

U.S. PATENT DOCUMENTS

| | | | |
|---|---|---|---|
| 321,437 | 7/1885 | Horton | 43/118 |
| 333,676 | 1/1886 | Sanford | 43/118 |
| 1,787,421 | 12/1930 | Ruddell | 43/107 |
| 1,968,953 | 8/1934 | Metzger | 43/107 |
| 2,162,502 | 6/1939 | Goulard | 43/107 |
| 2,809,465 | 10/1957 | Guinotte | 43/122 |
| 4,501,088 | 2/1985 | Boisvert | 43/118 |
| 4,557,069 | 12/1985 | Caldwell | 43/122 |
| 4,706,410 | 11/1987 | Briese | 43/122 |

Primary Examiner—Kurt Rowan
Attorney, Agent, or Firm—Keith S. Bergman

[57] ABSTRACT

Entry structure for a containment type insect trap having a flexible containment bag is disclosed. A first disposable configuration of my entry structure provides a vaned column slidably carried in a fastening plate to move from an inward closed position to an outward open position to provide a trap that may be used as its own container for merchandising, opened for use and after use closed to be used as a disposal container. A second reusable configuration of my entry structure releasably fastens the entry structure to the fastening plate so that both may be reused with new containment bags and attractant. The vaned configuration of the entryway column aids insect entrapment and dispersement of airborne odoriferous attractant from the trap containment bag. The trap provides the common amenities of known containment type insect traps to aid insect attraction, entrapment, killing, and disposal.

5 Claims, 3 Drawing Sheets

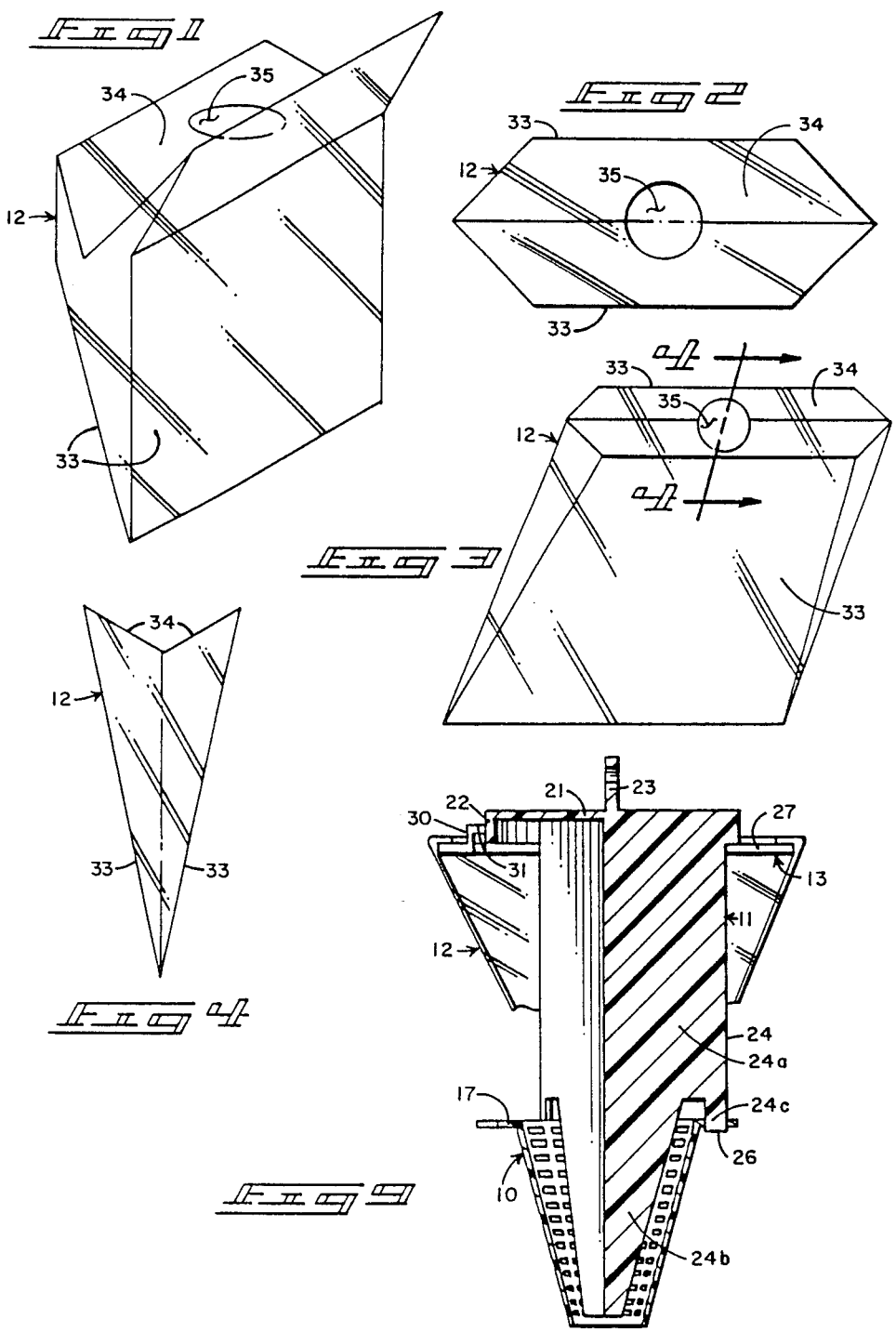

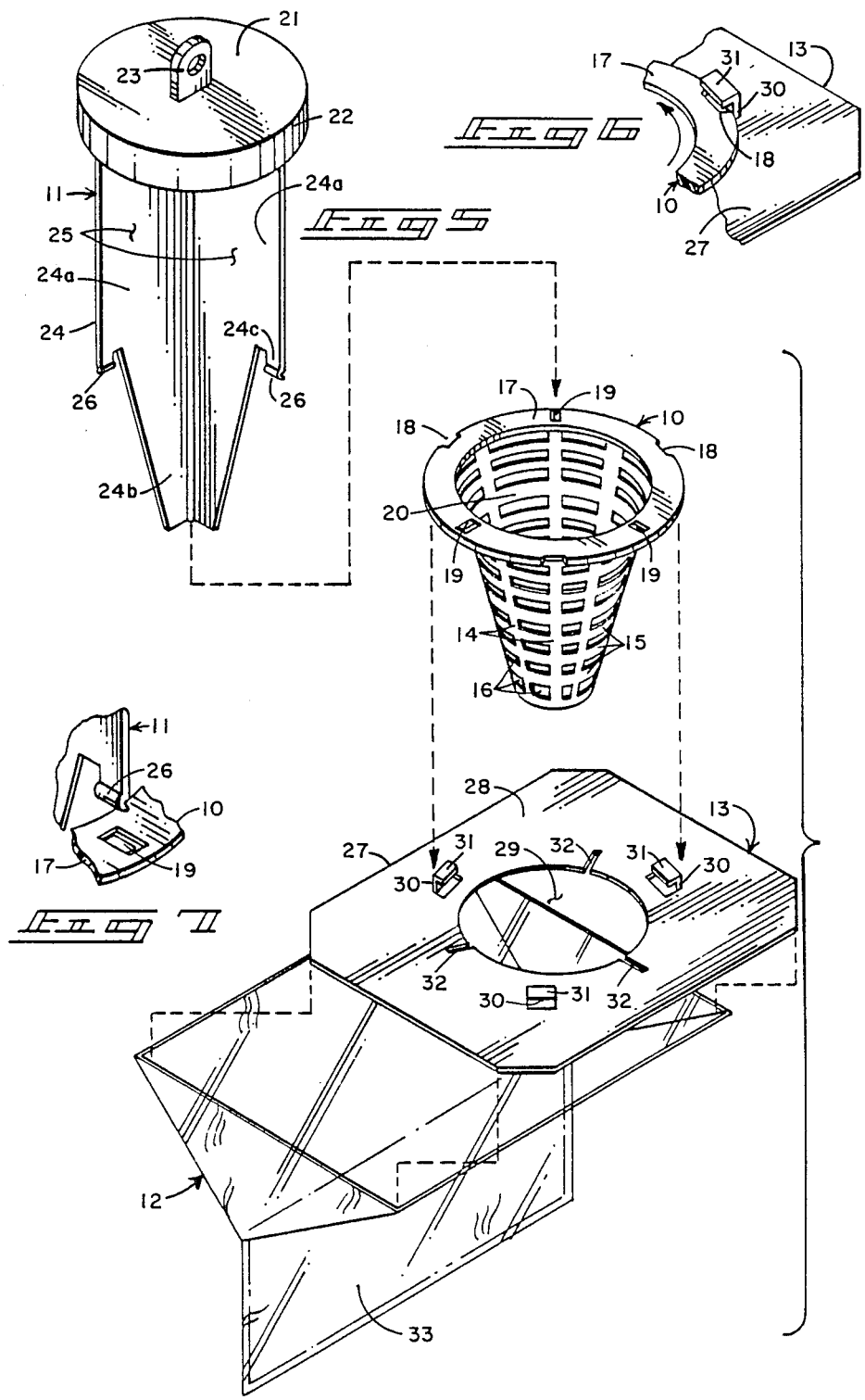

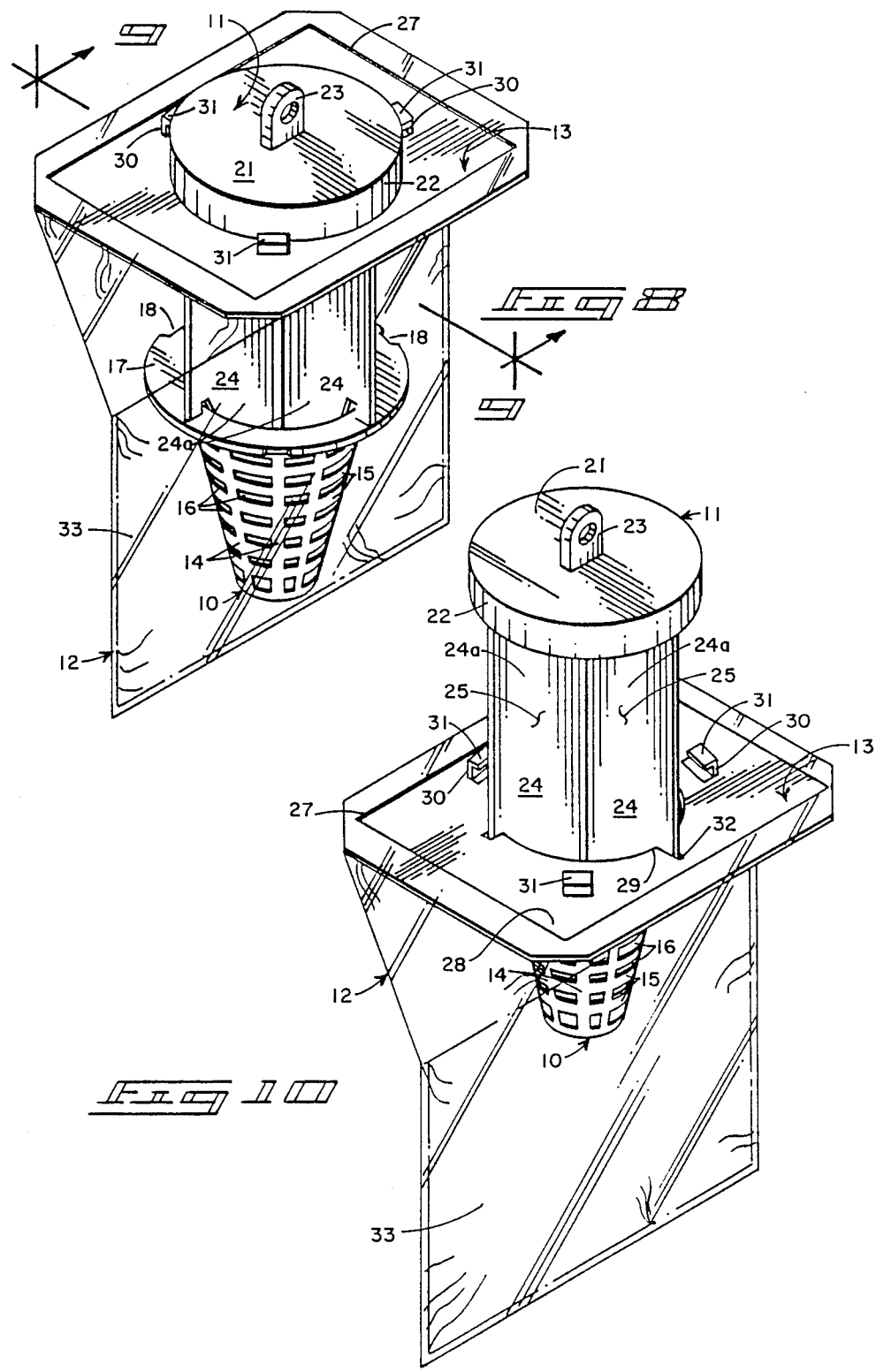

ENTRY STRUCTURE FOR FLEXIBLE BAG TYPE INSECT TRAP

II. BACKGROUND OF INVENTION

IIA. RELATED APPLICATIONS

There are no applications directly related hereto heretofore filed in this or any foreign country.

IIB. FIELD OF INVENTION

My invention relates generally to entrapment type insect traps and particularly to an entry structure for such traps that is assembliable in a first configuration that may be opened and closed and in a second configuration releasably attaching a replaceable flexible containment bag for reuse.

IIC. BACKGROUND AND DESCRIPTION OF PRIOR ART

Responsive to environmental concerns of the recent past, the destruction of insect pests has increasingly changed from various forms of poisoning to other more environmentally neutral processes. Entrapment has emerged as one of the major branches of such environmentally neutral processes for insect destruction. Entrapment devices have markedly increased in sophistication and effectiveness and decreased in cost in the course of their development to further enhance their desirability. The instant invention provides a new and novel entry structure for this class of device.

Most insect entrapment devices of the past have provided rigid structures for both an entryway-entrapment member and a containment member, sometimes separately formed and interconnected and other times unitarily formed. With the increased sophistication and economic amongst such devices, the entry member commonly has become separately formed from the containment member with releasable joinder means interconnecting the two members to form a trap so that the trap may be reused, generally only with cleaning and replacement of attractants. With the advent of plastic materials, the formerly generally rigid containment member has devolved into a flexibly resilient bag formed of polymeric or resinous materials. The instant invention embodies this prior art sophistication, but yet provides a new and novel entry structure that selectively allows two configurations providing, respectively, single use or multiple reuse of a trap upon replacement of attractant and containment members.

Present day containment members may be, and generally are, formed from flexible sheet plastic material to provide low product cost. Entryway and entrapment structure, however, generally have been formed from rigid or semi-rigid material as that structure will not otherwise maintain its configuration which is essential to its functioning. These material requirements have caused problems in the releasable joinder of two structures, especially in view of the fact that the containment bag may carry a substantial amount of fluid which has a relatively high mass. I solve this joinder problem by providing a fastening plate of some substantial area that carries and supports the entry structure and is carried in the containment bag. This joinder structure distributes forces between the joined members over a substantial area and also distributes the line of highest shear potential over a substantial length, all to create a strong and durable joinder.

My entry structure provides a closure cap to open and close the entryway upon manipulation of the support column carrying it. This is especially desirable in modern insect traps of the containment type as in general, to be economically competitive, such traps should provide their own packaging as individual units for merchandising and, for aesthetic and environmental desirability, should provide some means of closing the containment structure for disposition after use. Prior art devices, in distinguishment, have generally either provided no closure means at all or in some instances have provided closure structure for merchandising that once opened cannot be reused for disposal or otherwise, at least in a convenient manner.

The particular configuration of the closure element of my invention provides additional functional utility. The structure provides a support column formed of at least two planar elements interconnected in their medial portions and carried in the entry structure to define plural entry channels in that structure. This provides plural entryways of substantial total area in distinguishment from the prior art which generally has provided only a single entry orifice of relatively small area, or at least has not provided multiple entry channels that are defined for any substantial distance on either side of an entry orifice or within an entryway cone. This structure allows simultaneous use of the plural channels by several insects at the same time, whereas, if a single channel be occupied by one insect, in general other insects will not use that channel until that first insect exits from it, to lessen the efficiency of that type of entrapment structure.

My closure structure provides an additional benefit in aiding the dispersement of airborne odoriferous attractant material from within the containment chamber of the device. In general, containment type insect traps provide some sort of attractant to cause insects to enter therein. Many and various attractants are known, but most provide some airborne vaporous olfactory attractant that is either contained or generated in the containment bag, optimally including species specific pheromones and odoriferous components of, or facsimiles simulating, specific food stuffs. The dispersement of such attractants from a containment bag is oftentimes difficult and the efficiency of a particular trap will vary more or less directly in proportion to the dispersement of such odoriferous materials. The particular multi-channel defining pillar structure of my invention aids attractant dispersement, as the channels in a windward direction tend to catch the wind from the ambient atmosphere and channel it downwardly into the containment chamber. The channels facing away from the wind direction tend to serve as exit orifices, all to establish an air flow pattern through the containment chamber to aid in dispersing airborne attractant.

In differing circumstances, it may be desirable to have a containment trap for single use or for multiple reuse upon replacement of exhaustable components. My particular entry structure is adapted to either type of use by assembly in one of two different configurations. Generally in a non-commercial residential type application, a trap is desired for single use and should provide some sort of closure for disposition of the expended trap and contained debris upon exhaustation. On the other hand in commercial applications where aesthetics are not a principal concern but cost is, an entrapment structure having replaceable expendable elements is desired for the ultimate in cost saving. My invention satisfies the commercial use requirements by providing a selective configuration in which the more expensive entryway structure may be reused while the expended entrapment bag may be removed and replaced with a new containment bag and new attractant material for reuse to make such replacement less costly than replacement of the entire structure.

My invention resides not in any one of these features per se, but rather in the synergistic combination of all of them that gives rise to the the particular structures disclosed and the functions necessarily flowing therefrom, as hereinafter more fully specified and claimed.

III. SUMMARY OF INVENTION

My invention provides a compound entryway and entrapment structure for a containment type insect trap having a flexible containment bag. The entryway is defined by an inverted truncated conic structure having an upper base rim to interfit with a rigid fastening plate that is fastenably carried in the containment bag. In a first single use configuration, the conic rim is downwardly adjacent the fastening plate and in a second reusuable configuration the conic rim is upwardly adjacent the fastening plate. The fastening plate defines a medial entry orifice and in the single use configuration slidably receives a pillar carrying a cap to cover the plate orifice when in lowered position and to open that orifice when in raised position. The pillar extends upwardly from the conic base rim in the second reusable configuration. The pillar defines plural elongate channels forming plural entryways above and in the conic entry structure and through the orifice in the fastening plate. The lower portion of the pillar provides fastening means to releasably fasten to the rim of the entry structure in either configuration. The cap provides means to aid trap support by suspension and the entire structure provides traditional amenities to aid in entrapping and killing insects.

In creating such a device, it is:

A principal object of my invention to provide a rigid entryway and entrapment structure that attaches a flexible containment bag in different configurations for either single use or multiple reuse.

A further object of my invention to provide such a structure that in its single use configuration defines an entry orifice in the fastening plate structure that slidably carries cap structure on a pillar which extends through the entry orifice for slidable motion to open and close that orifice.

A further object of my invention to provide such structure with a pillar formed by septa to define plural channels providing multiple separated entryways through the entry structure to aid both insect entry and attractant dispersement.

A still further object of my invention to provide a containment-type insect trap embodying the foregoing features, while still providing the various amenities heretofore known and commonly used in present day containment-type insect traps.

A still further object of my invention to provide such a device that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

IV. BRIEF DESCRIPTION OF DRAWINGS

In the accompanying drawings which form a part hereof and wherein like numbers of reference refer to similar parts throughout:

FIG. 1 is an isometric side view of a partially unfolded, flexible containment bag for use with my invention.

FIG. 2 is an orthographic top view of the bag of FIG. 1.

FIG. 3 is an isometric surface view of the bag of FIG. 1 with its top extended to show the orifice defined therein.

FIG. 4 is an orthographic end view of the flexible containment bag of FIG. 1.

FIG. 5 is an exploded isometric view of the elements of my invention as they would be assembled in the reusable mode.

FIG. 6 is a partial cut-away, isometric view showing the fastening of the entry structure to the fastening plate.

FIG. 7 is a partial cut-away isometric view showing the structure that fastens the support column to the base rim of the entry structure.

FIG. 8 is an isometric view showing the single use configuration of my invention with the cap closed.

FIG. 9 is a vertical cross-sectional view of the structure of FIG. 8 taken on the line 9—9 thereon in the direction indicated by the arrows.

FIG. 10 is an isometric view of the same structure as FIG. 8, but with the cap in a raised position to make the trap operative.

V. DESCRIPTION OF PREFERRED EMBODIMENT

My invention generally provides rigid entry member 10 interconnected to closure structure 11 which is supported in fastening plate 13 carried in containment bag 12.

Entry member 10, as seen especially in FIG. 5, provides a peripherally defined rigid truncated conic structure formed by interconnecting vertical linear elements 14 and horizontal ring elements 15 to define a plurality of orifices 16 therebetween. The upper or base portion of this entry structure provides horizontally outwardly extending annular connecting rim 17 defining symmetrically spaced fastening slots 18 extending inwardly from the connecting ring periphery to provide means for releasably fastening the structure to fastening plate 13. The rim 17 is substantially planar to allow proper interconnection and fastening with the fastening plate. The truncated lower portion of the entryway member defines medial entry orifice 20 to admit insects into containment bag 12. Connecting rim 17 defines plural fastening holes 19 in its medial area, symmetrically and spacedly arrayed relative to the fastening slots 18, to allow releasable interconnection of the entry member with the support pillar of the closure structure.

The entire entry member must be rigid to fulfill its purpose, but its particular detailed configuration and dimensioning are not critical so long as its essence be preserved. Preferably the structure will be formed substantially in the configuration illustrated by molding from a polymeric or resinous plastic material. Various of the details of the structure of this type of entry member may affect the efficiency of insect entrapment and those variable parameters should be determined in light of the teachings of the prior art to provide maximum entrapment efficiency.

Closing structure 11 provides cap 21 having depending sealing skirt 22 and upwardly projecting fastening loop 23 to aid suspension type fastening of the structure from some structural support thereabove. The cap structurally communicates with a pillar formed by medially interconnected and radially extending vanes 24 which define channels 25 therebetween. In the instance illustrated the vanes are three in number for ease of manufacture and operation, but their number may vary and remain within the ambit and scope of my invention. The external diameter of the body portion 24a of the vanes is approximately the same as the diameter of the periphery of entry structure rim 17 and their length is such that when the pillar be carried in the entry element, its upper portion will project a spaced distance above rim 17 of the entry member. The lower portion 24b of the vanes tapers to fit inwardly adjacent the inner surface of the entry cone. Transition portion 24c of the vanes define depending hook-like fasteners 26 to fasten within fastening orifices 19 defined in entry cone rim 17 to interconnect these members.

Fastening plate 13 provides body 27 having fastening surface 28 adapted to fit immediately adjacent the surface of rim 17 of the entry member. Plate body 27 in its medial portion defines entry orifice 29, which is smaller than the outer peripheral diameter of annular entry cone rim 17 and of substantially the same diameter as the external surface of that cone immediately adjacent the rim. The orifice communicates with plural outwardly extending slots 32 to slidably receive the vanes of the pillar of closing structure 11 therein. The sliding fit between the pillar structure and fastening plate orifice is such as to generate sufficient frictional force to positionally maintain the elements relative to each other, but yet allow their relative sliding motion upon appropriate manual manipulation.

Fastening surface 28 of fastening plate 13 provides three fastening brackets 30, 31 symmetrically arrayed and so positioned to releasably fasten the fastening plate to rim 17 of the entry member. These brackets each provide vertically depending bodies 30 carrying radially inwardly extending fastening legs 31, both structurally arrayed so that the radially inner surface of bodies 30 define a circle substantially the same size as the periphery of upper rim 17 of the entryway member. Fastening legs 31 are slightly smaller in size than slots 18 defined in rim 17 so that the two members may be placed in adjacency with fastening legs 31 in fastening slots 18, then moved together, and one element rotated relative to the other to cause releasable fastening between both elements. Vertical body portion 30 has an extension away from the fastening plate substantially equal to the thickness of rim 17 so that when the two elements are in fastened position, there is some frictional force between them tending to maintain that position.

Containment bag 12 for use with my invention is illustrated in FIGS. 1, 2 and 3. Bag 33, in the instance illustrated, is formed by two similar half elements structurally joined at their adjacent edges to form a liquid impervious container. Upper portion 34 of the bag defines orifice 35, of the same size as entry orifice 29 in fastening plate 27, to allow passage of the closure structure support pillar therethrough and is so configured as to provide a reasonably flat portion about that orifice to allow appropriate interconnection with the fastening plate or between that plate and the entry structure rim 17.

It is to be noted in the containment bag illustrated that the top orifice must be such as to allow the entry of fastening plate 13 therethrough, but yet when the material defining that orifice be in flat relaxed position, the orifice must be smaller than the periphery of entry member rim 17. The insertion of the fastening plate within the containment bag under these circumstances is accomplished either by placement during bag formation or by appropriate reconfiguration and, if necessary, deformation of the material surrounding and defining orifice 35. The bag structure preferably is mechanically fastened by adhesion or otherwise to the fastening plate, so as to provide additional support for the bag and secure positional maintance against forces tending to dislodge it from its fastened position, though this may not be necessary to my invention in its second or reusable configuration.

The bag may also be formed with an openable seam to allow insertion of the fastening plate. This may be readily accomplished by releasably fastenable seam structures such as the so called plastic bag zipper well known in this field of art.

Preferably bag 33 is formed of a translucent sheet-type polymeric material, such as one of the polyvinyl or polypropylene plastics or a combination of them. The absolute size and configuration of the containment bag is not particularly critical, though it should provide traditional amenities heretofore known to aid in the entrapment of insects and disposal of their carcasses. The relative dimensions and configurations of the containment bag must be related to characteristics of the entry member so that the containment bag may define an orifice through which the entry member may pass and may provide appropriate space and contain sufficient fluid and attractant materials to allow effective trapping and killing operations.

Having thusly described the structure of my invention, its operation may be understood.

Firstly, an entry structure is formed according to the foregoing specification and as illustrated in the accompanying drawings. Normally after manufacture, the trap embodying my entry structure will be assembled and merchandised with the containment bag serving as a container for merchandising.

The assembly of my entry structure in its first single use configuration is illustrated in FIGS. 8-10. In this configuration, the fastening plate is attached to the inner surface of the top portion of the containment bag with the bag orifice aligned with the orifice defined in the fastening plate as illustrated. The support pillar 24 is inserted through entry orifice 29 defined in the fastening plate 13. The entry cone is then releasably fastened to the lower portion of the support column by moving the cone structure over the lowermost tapered portion 24b of the support pillar and then fastening elements 26 in cooperating holes 19 defined in upper annular rim 17 of the conic entryway member. It is to be noted in this assemblage that the support pillar must be inserted in the orifice defined in the fastening plate before the conic entry element is attached to the lower portion of the support pillar because of the relative sizes of the interfitting portions of these elements on both sides of the fastening plate.

In this first configuration the conic entry element will, of necessity, have to be placed within a permanently seamed containment bag during the bag formation process as it may be established in the bag thereafter since it will not pass through the entry orifice defined in fastening plate 13. The fastening plate in this configuration should be oriented with surface 28 upward as fastening brackets 30, 31 if orientated downward may prevent complete opening of the entry structure with rim 17 and the fastening plate in immediate adjacency with only the bag therebetween.

The second reusable configuration of my entryway structure is illustrated especially in FIG. 5. Here the conical entryway element is attached about lower portion 24b of support pillar 24 by appropriately positioning the members and interconnecting fastening elements 26 of the pillar structure within fastening holes 19 of the rim of the entry member. Fastening plate 13 is then positioned on the inner side of the upper surface of containment bag 12 with its entry orifice 29 aligned with orifice 35 defined by that bag. The conic entry element is then inserted, with its base rim 17 uppermost, into the entry orifice defined in fastening plate 13 and moved by appropriate manual manipulation until fastening slots 18 defined in the peripheral edge of the rim 17 are aligned with fastening brackets 30, 31 of the fastening plate. The two members are then moved together into immediate adjacency and the fastening plate and entry cone rotated relative to each other so that slots 18 are not beneath fastening brackets 30, 31 to releasably fasten these members together.

In this second configuration, fastening plate 13 may or may not be adhered to the containment bag as desired. If the plate be not adhered, it is to be noted that the portion of the bag structure about the area defining orifice 35 will be positioned between the adjacent surfaces of the fastening plate and rim 17 of the conic entryway member and will be fastenably carried therebetween. The fastenable interconnection of the bag between these elements will be enhanced by reason of the bag's deformation between the two members in the area of the fastening brackets 30, 31. It is to be noted that if the fastening plate and containment bag be not fastened to each other for reuse, only the containment bag need be replaced, whereas if the bag and fastening plate are irreleasably fastened, then the fastening plate also must be replaced for reusage.

In normal merchandising of the first configuration of my invention, closure structure 11 will be in closed mode with cap sealing skirt 22 adjacent the upper outer surface of fastening plate 13. Normally when merchandised, the trap will have some sort of attractant carried within the chamber defined by containment bag 12. The cap maintains this material within the bag when in its closed mode. Such attractant material commonly is encapsulated and comprises odoriferous materials or progenators of such material that are attractive to insects generally or specifically to those to be entrapped. Such substances are known in the prior art and constitute no part of my invention per se. Commonly attractants will include odoriferous food products or materials simulating the odors of common food for the particular insects in question and pheromones, though attractant constituency may vary widely and the various materials known for such purposes are useful with my invention.

The second configuration of my invention may be merchandised with all of its parts contained in a containment bag, if the fastening plate 13 be not preconnected to the containment bag or if the bag be formed with an openable seam. If the fastening plate is interconnected to a permanently formed containment bag during manufacture, the conic entryway structure and support pillar may not be contained within that containment bag unless it have a releasable seam, as they could not be removed therefrom. The second configuration normally provides attractant in the same fashion as the first configuration.

To use my trap, the containment bag commonly will be partially filled with water to provide an environment that aids in hastening insects' demise once they are entrapped and to provide an appropriate environment for the maintenance, storage and production of odoriferous attractant materials. To fill the containment bag with water, the closure element is opened or removed, the attractant opened if necessary, and water added to the bag chamber through entry orifice 29 defined in the fastening plate. If necessary, the encapsulation structure of the attractant material is opened and the trap is then suspended by fastening element 23 in an appropriate location for insect entrapment. The trap then normally functions automatically during its active life according to principles known in the prior art.

It is to be noted that during use of my invention, there will be defined plural entryways through channels 25 into entry orifice 29 and through the conic entry element therebelow. These channels will be separated from each other by defining septa 24. Normally most insects will not enter an entry orifice to an entrapment structure when it is occupied by another insect, so the provision of a plurality of entry orifices raises the probability, during a specific time period and generally absolutely, of the efficiency of an entrapment structure.

It is further to be noted that these multiple entry channels 25, since they project upwardly from the entry orifice 29 of the fastening plate and are facing in various azimuthal directions, will tend to divert impinging wind or air motion downwardly through the channel or channels facing the wind and into the containment chamber of bag 33. Since simultaneously other channels are open to the ambient atmosphere, air pressure will not be increased within the containment bag above the pressure of the ambient atmosphere, and an amount of air equivalent to that entering the containment bag will be exhausted through other entry channels 25 to the ambient atmosphere. Since odoriferous attractants are airborne and are generated within the containment chamber, this increased flow of air through the containment chamber will tend to more rapidly and more efficiently move the odoriferous material from that chamber and externally thereof where it is operative. The efficiency of the entrapment structure is thereby increased by the synergistic action of the structure of my invention in enhancing the dissipation of attractants in the containment bag.

It is to be further noted that in the second configuration of my trap, upon exhaustion of trap components, the containment bag may be removed in the inverse fashion from which it was placed and if removed, it may be sealed or closed by ordinary known methods, such as a tie or fastener, for disposal. A new bag with new attractant material may then be placed on the fastening plate, as previously described, to allow reuse of my invention in further insect trapping operations. Normally there is little deterioration of the structure of my invention during use and it well may be reused for an almost indefinite period. Since all that need be replaced, if the entryway structure be reused, is the containment bag and its attractant, or additionally the fastening plate if interconnected, the cost of replacement will be appreciably less than replacing the entire trap structure. This replacement feature is especially desirable in some commercial applications.

It is further to be noted that in the first configuration of my invention the structure itself may be used as a closure mechanism for disposition of the exhausted trap and its contents. To accomplish this the support pillar and cap in its upper portion are merely moved downwardly relative to the fastening plate until the cap skirt comes to rest on the upper surface of the portion of the containment bag immediately upwardly adjacent the fastening plate and surrounding the orifice 35. This will cause a closure, somewhat of a sealing nature depending upon the exact configuration of the interconnecting surface, and the entire bag with its contents of insects, exhausted attractant and liquid component may then be disposed of as ordinary waste material.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. An entry structure for a containment type insect trap, having a flexible containment bag with an orifice defined in its top portion for passage of and interconnection with the entry structure, comprising, in combination:
   a peripherally defined truncated conic entry member having an annular rim extending outwardly from the base, said annular rim having first means to releasably fasten a fastening plate adjacent thereto and second fastening means to fasten a pillar of a closing structure thereto;
   a closing structure having an upper cap carried by a depending pillar defining plural elongate channels extending inwardly from its periphery, said pillar having a lower portion configured to fit within the truncated conic entry member and fastening means to cooperatively fasten with the second fastening means of the conic entryway member; and
   a fastening plate, defining a medial entry orifice slidably carrying the upper portion of the closing structure pillar, said fastening plate configured to fit immediately upwardly adjacent the annular rim of the entry member and having means to releasably fasten with the first fastening means of the annular rim.

2. The invention of claim 1 further characterized by:
   the closing structure pillar being slidably carried in the orifice defined in the fastening plate with the upper cap on a first side of the fastening plate and the entry structure releasably attached to the closing structure pillar on the second side of the fastening plate.

3. The invention of claim 1 further characterized by:
   the closing structure pillar extending within and fastened to the truncated conic entry member and the entry member carried within the orifice defined by the fastening plate, with the entry member rim on the fastening plate side defining its first fastening means, said entry member rim being releasably fastened to the fastening member.

4. A single use rigid entry structure for a containment type insect trap having a flexible containment bag defining an entry orifice in its upper portion and carried by the entry structure, comprising, in combination:
   a truncated peripherally defined conic entry element having a plurality of spaced orifice and a planar annular base rim extending a spaced distance radially outwardly from the conic surface, said annular base rim having first fastening means for attachment to a pillar of a closing structure and second fastening means for releasable fastening with a fastening plate;
   a fastening plate defining a medial entry orifice slidably carrying a closure structure pillar therein and releasably fasten with the second fastening means of the base rim;
   a closure structure having a cap carried at a first upper end of a pillar defining plural axially aligned channels extending radially inwardly from its periphery, a second lower end configured to fit within the truncated conic entry member, and medial fastening means fastening with the first fastening means of the entry member annular rim with the first end of the pillar extending away from the base of the entry structure; and
   a flexible containment bag, defining an orifice in its upper portion, fastenably carrying the fastening plate within the containment bag chamber with its entry orifice aligned with the containment bag entry orifice.

5. A reusable rigid entry structure for a containment type insect trap, having a flexible containment bag defining an entry orifice in its upper portion, releasably carried by the entry structure, comprising, in combination:
   a peripherally defined truncated conic entry member having a plurality of spaced orifices, and a planar annular base rim extending a spaced distance radially outwardly from the conic surface, said annular base rim having first fastening means for releasable attachment to a fastening plate and second fastening means to releasably fasten to a pillar of a closing structure;
   a fastening plate, areally larger than the base rim of the conic entry member, defining a medial entry orifice carrying the conic entry member but not allowing passage of its annular base rim therethrough, having means to releasably fasten to the first fastening means of the annular base rim of the entry member to maintain a portion of a flexible containment bag therebetween,
   a closure structure having a pillar defining plural vertical channels extending inwardly from its periphery, a second lower end carried within the truncated conic entry member, and medial fastening means fastened with the second fastening means of the entry member rim; and
   a flexible containment bag, defining an orifice in its upper portion, releasably fastenably carried between the entryway rim and the adjacent fastening plate with the fastening plate within the bag and the bag depending therefrom.

* * * * *